United States Patent
Seki et al.

(10) Patent No.: US 6,340,873 B2
(45) Date of Patent: Jan. 22, 2002

(54) SEMICONDUCTOR INTEGRATED CIRCUIT FOR BRUSHLESS MOTOR DRIVE CONTROL AND BRUSHLESS MOTOR DRIVE CONTROL APPARATUS

(75) Inventors: Kunio Seki, Hinode; Toshiyuki Tsunoda, Maebashi; Yasuhiko Kokami; Kunihiro Kawauchi, both of Takasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/893,549

(22) Filed: Jun. 29, 2001

Related U.S. Application Data

(63) Continuation of application No. 09/818,511, filed on Mar. 28, 2001.

(30) Foreign Application Priority Data

Mar. 29, 2000 (JP) .......................................... 2000-090037

(51) Int. Cl.⁷ ................................. H02P 5/40; H02P 7/00
(52) U.S. Cl. ....................... 318/254; 318/723; 318/439; 318/560
(58) Field of Search ................................. 318/138, 139, 318/245, 254, 439, 807, 809, 811, 723, 431, 696, 727, 430, 702, 778, 721; 323/246, 320; 360/72–88

(56) References Cited

U.S. PATENT DOCUMENTS

| | | | | |
|---|---|---|---|---|
| 4,746,850 A | * | 5/1988 | Abbondanti | 318/723 |
| 4,892,863 A | * | 1/1990 | Agarwala | 505/1 |
| 4,992,710 A | * | 2/1991 | Cassat | 318/254 |
| 5,001,405 A | * | 3/1991 | Cassat | 318/254 |
| 5,028,852 A | * | 7/1991 | Dunfield | 318/254 |
| 5,068,582 A | * | 11/1991 | Scott | 318/254 |
| 5,113,125 A | * | 5/1992 | Stacey | 318/721 |
| 5,117,165 A | * | 5/1992 | Cassat et al. | 318/254 |
| 5,254,914 A | * | 10/1993 | Dunfield et al. | 318/254 |
| 5,428,281 A | * | 6/1995 | Seki et al. | 318/696 |
| 5,717,298 A | * | 2/1998 | Tang et al. | 318/254 |
| 5,847,521 A | * | 12/1998 | Morikawa et al. | 318/254 |
| 6,081,093 A | * | 6/2000 | Oguro | 318/807 |

FOREIGN PATENT DOCUMENTS

| | | |
|---|---|---|
| JP | 63-69489 | 3/1988 |
| JP | 3-207250 | 9/1991 |
| JP | 7-274585 | 10/1995 |

* cited by examiner

Primary Examiner—Paul Ip
(74) Attorney, Agent, or Firm—Mattingly, Stanger & Malur, P.C.

(57) ABSTRACT

A pulse current having such a short duration as the rotor does not react is passed through field coils of respective phases of a brushless motor in first and second, mutually opposite, directions sequentially, voltages induced, by the pulse currents in two directions at each of the field coils of the non-conducting phase are combined, the polarity of a combined voltage is detected, and a field coil pair where a current is to be passed to start the motor is determined based on the result of detection for each of field coil of the non-conducting phase.

4 Claims, 12 Drawing Sheets

SEMICONDUCTOR INTEGRATED CIRCUIT FOR BRUSHLESS MOTOR DRIVE CONTROL AND BRUSHLESS MOTOR DRIVE CONTROL APPARATUS

This is a continuation application of U.S. Ser. No. 09/818,511, filed Mar. 28, 2001.

BACKGROUND OF THE INVENTION

The present invention relates to a technique for drive control of a brushless motor and a technique effective when applied to a method for determining phases (a pair of phases) at which to start current conduction when starting the motor, and particularly concerns a technique effective when used in a drive control apparatus of a spindle motor for rotating a disk-type storage medium, such as a HDD (hard disk drive) device.

With hard disk devices, there has been a strong demand for higher speed in writing and reading information on a magnetic disk, namely, quicker access speed. To this end, it is required that the spindle motor be made much faster. In addition, demand is also mounting for reductions in size, power consumption and production cost of the drive control apparatuses. In conventional hard disk devices, DC polyphase brushless motors are generally used for their spindle motor to rotate the magnetic disks at high speed, and information is written or read on the rotating magnetic disk by bringing the read/write magnetic heads into contact with or in close vicinity to the disk.

In brushlress motors, there has been used a motor drive control method by which to prevent reverse rotation of the motor by detecting the positional relation of the rotor and the stator by means of Hall elements and by, from the detected positional relation, determining field-coil phases at which current conduction is to be started. Because mounting a rotor position detector using Hall elements in the motor increases the difficulty of downsizing the motor, sensorless motors have come to be used in large numbers in the hard disk devices. However, if the magnetic disk is driven by a sensorless motor, the rotor is likely to make a reverse rotation for an instant with a probability of ½ when the disk starts to rotate.

With the rapidly multiplying storage density of the magnetic disks in hard disk devices in recent years, the magnetic read/write heads have been sharply reduced in size. Consequently, in the hard disk devices with the magnetic heads miniaturized to such an extent, there is a problem that if the rotor is turned in reverse even for an instant, the magnetic heads may suffer a fatal damage. To solve this problem, a control method has been proposed in which a pulse current of so short a duration as not to cause the rotor to react is supplied to the field coils of the stator, and the field coils where the amplitude is at the maximum value, in other words, the phases, where the field of the rotor magnet in the same direction as the generated field of the coils, causing magnetization to be saturated to make current flow most easily, are determined as the phases at which to start current conduction (Refer to JP-A-63-694895 published on Mar. 29, 1988 which corresponds to U.S. Ser. No. 880754 filed on Jul. 1, 1986).

Another control method has been proposed in which a pulse current is conducted through the field coils of the stator and then the pulse current is conducted in the opposite direction, and differences in current rise time constant are detected at respective field coils where the current is passed through, and according to detection results, the position of the rotor is determined to determine a pair of phases at which current conduction is started. In other words, this control method is such that phases at which current conduction is started are determined by determining the rotor position based on detection results obtained by detection of differences in inductance by making use of a phenomenon that the inductance of the field coils varies whether the direction of the magnetic field is the same or not between the field coils and the rotor magnet (that is to say, whether magnetic saturation occurs or not) (Refer to JP-A-3-207250 published on Sep. 10, 1991 which corresponds to U.S. Ser. No. 413311 filed on Sep. 27, 1989).

In addition to the above inventions, another invention has been proposed that the stopped position of the rotor is determined by applying a diagnosis signal of a frequency higher than the frequency of an exciting signal applied when the motor is started, to a single coil or two or more coils connected in series and detecting an induced voltage of one of the serially-connected coils (Refer to JP-A-7-274585 published on Oct. 20, 1995).

SUMMARY OF THE INVENTION

However, the present inventors have revealed that the prior art described above suffer problems as follows.

In the control method that determines a pair of phases, where current conduction is started, by passing a pulse current and detecting the maximum amplitude value, the maximum amplitude value depends on variations in winding in the field coils of the stator, for which reason detection errors occur due to very small winding variations that are unavoidable in the manufacturing process. In the control method that determines a pair of phases, where current conduction is started, by detecting the rotor position based on differences in current rise time constant, because a phenomenon of magnetic saturation is used, differences in time constant do not become conspicuous unless a fairly large current is passed, and therefore it is difficult to detect differences in the time constant when a current passed is so small as the rotor does not react to it. Another problem with this control method is that the point of reversal of the large-small relation among the time constants that occurs when the direction of a current is reversed does not coincide with the point of magnetic saturation, resulting in errors in determination results.

The present invention has as its object to provide a brushless motor drive control technique that can prevents reverse rotation of the motor at starting by detecting the position of the rotor relative to the stator with fewer errors and determining a field coil pair at which current conduction is started.

According to an aspect of the present invention, a pair of phases for current conduction to start the motor is determined by passing a pulse current with a duration so short as the rotor does not react through the field coil of any phase of the motor in first and second, mutually opposite, directions sequentially, and detecting induced voltages in the non-conducting phase by a pulse current in two opposite directions, combining voltages induced by a pulse current in the first direction and a pulse current in the second direction, detecting the polarities of combination results, and determining a pair of phases for current conduction when starting the motor based on polarity detection results related to a plurality of the conducting phases.

The above-mentioned and other objects and features of the present invention will become obvious from the following description of this specification and the accompanying drawings.

DESCRIPTION OF THE EMBODIMENTS

Embodiments will be described with reference to the accompanying drawings.

Before proceeding with the description of the embodiments of the present invention, explanation will be made of the principle of rotor position detection, on which those embodiments are based, by referring to FIGS. 1a, 1b, 2a, 2b, 3a and 3b. These figures schematically illustrate the relation of any three field coils Lu, Lv and Lw representing 3×n (n is a positive integer) coils with respect to the rotor magnet in order to explain the positional relation of the field coils of the stator with respect to the rotor magnet MG in a three-phase type polyphase brushless motor. The PIO denotes a phase current output circuit to pass currents through the field coils Lu, Lv and Lw. This phase current output circuit outputs a total of six currents (including currents in mutually opposite directions) to conduct them through any pair of field coils according to a specified sequence to thereby rotate the rotor. In FIGS. 1a, 1b, 2a, 2b, 3a and 3b, the rotor magnet MG and the stator field coils Lu, Lv and Lw are arranged linearly but they are arranged coaxially in a real motor.

Figure 1A:
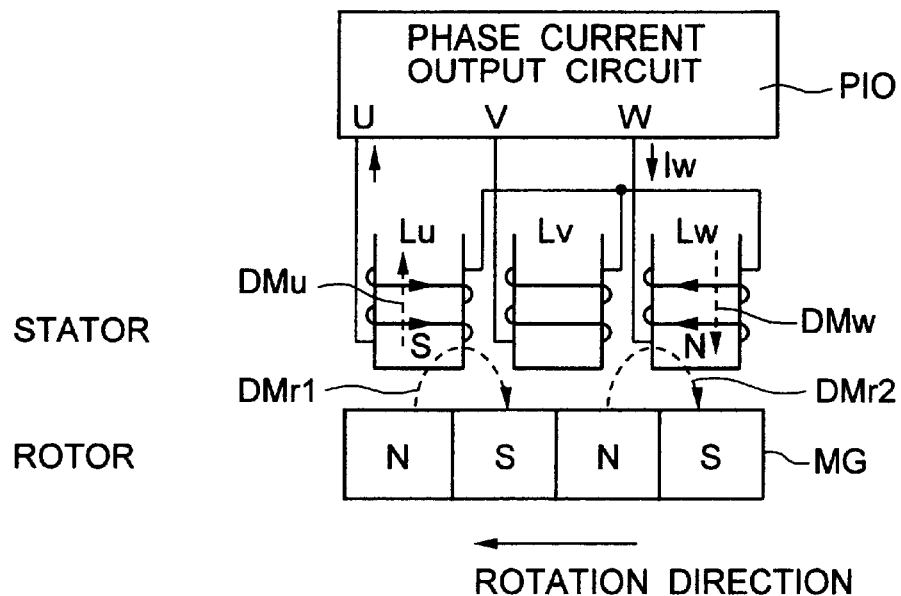
FIGS. 1a and 1b are schematic diagrams illustrating the principle of a rotor position detecting method according to one embodiment of the present invention, in each of which diagrams the rotor is at a standstill with the border between an S pole and an N pole of the magnet of the rotor coincident with the center of the field coil Lv of the stator.

FIG. 1a shows that the rotor is at a standstill with the border between an S pole and an N pole of the magnet MG of the rotor coincident with the center of the field coil Lv of the stator. Under this condition, when a short pulse current Iw is supplied from a phase current output terminal W, to which the field coil Lw is connected, to a phase current output terminal U, to which the field coil Lu is connected, the magnetic lines DMu produced by the field coil Lu are almost in the same direction as the magnetic lines DMr1 from the N pole of the magnet MG of the rotor facing the field coil Lu and, moreover, the magnetic lines DMw produced by the field coil Lw are almost in the same direction as the magnetic lines DMr2 of the S pole of the magnet MG of the rotor facing the field coil Lw. However, the magnetic lines DMu of the field coil Lu is in a direction opposite to the direction of the magnetic lines DMw of the field coil Lw. Because the border between the S pole and the N pole of the magnet MG coincides with the center of the field coil Lv of the stator, the leakage flux from the field coil Lu to the field coil Lv is the same in magnitude with and opposite in direction from the leakage flux from the field coil Lw to the field coil Lv and therefore they cancel each other, so that the induced voltage in the field coil Lv is zero.

Figure 1B:
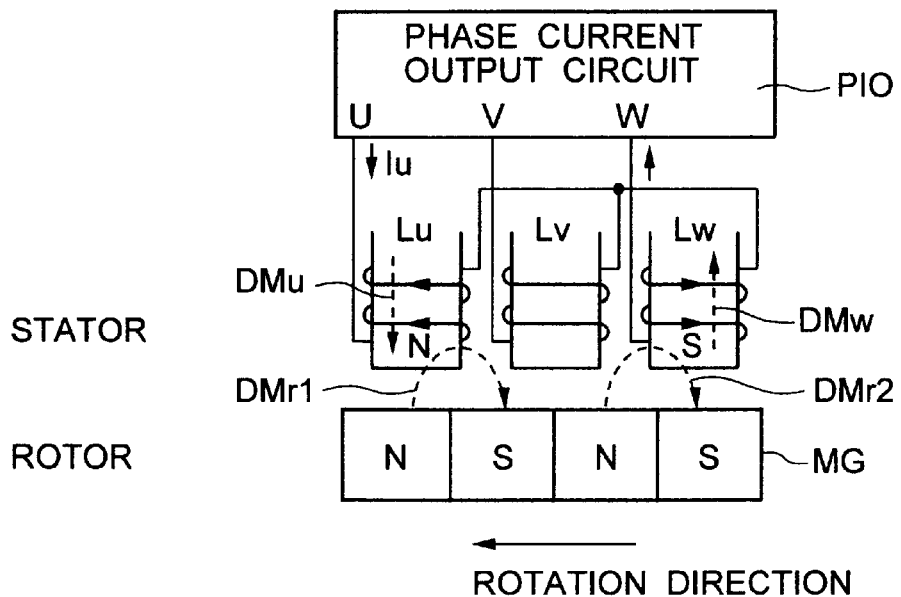

Under this condition, to pass a current through the field coils Lu and Lw in reverse direction, a short pulse current Iu is supplied from the phase current output terminal U to the phase current output terminal W as shown in FIG. 1b, the magnetic lines produced by the field coils Lu and Lw are respectively opposite in direction to the magnetic lines emerging from the N poles and going into the S poles of the magnet MG of the rotor which respectively face the field coils Lu and Lw. Therefore, the flux densities in the field coils Lu and Lw are lower than in FIG. 1a, and the leakage fluxes from the field coils Lu and Lw to the field coil Lv are small but are the same in magnitude and opposite in direction as in FIG. 1a, so that they cancel each other and the induced voltage in the field coil Lv is zero.

Description will now be made of the state that the rotor is at a standstill with the border of an S pole and an N pole of the magnet MG of the rotor being located a little shifted from the center of the field coil Lv to the field coil Lw as in FIG. 2a. Under this condition, because the N pole of the magnet MG squarely faces the front side of the field coil Lu, the density of the flux emerging from that portion of the magnet MG of the rotor which faces the field coil Lu and then passing through the field coil Lu is higher than the density of the flux emerging from that portion of the rotor magnet MG which faces the field coil Lw and then passing through the field coil Lw. Therefore, if a short pulse current Iu is supplied from the phase current output terminal W to the phase current output terminal U, the magnetic lines DMu produced by the field coil Lu is in the same direction as the above-mentioned flux (magnetic lines) emerging from that portion of the rotor magnet MG which faces the field coil Lu and then passing through the field coil Lu, and the magnetic lines DMw produced by the field coil Lw is also in the same direction as the above-mentioned flux (magnetic lines) emerging from that portion of the rotor magnet MG which faces the field coil Lw and then passing through the field coil Lw. However, due to the above-mentioned difference in flux density, the leakage flux ML1 from the field coil Lu to the field coil Lv is larger than the leakage flux ML2 from the field coil Lw to the field coil Lv, so that a voltage is induced in the field coil according to the difference in leakage flux.

Figure 2A:
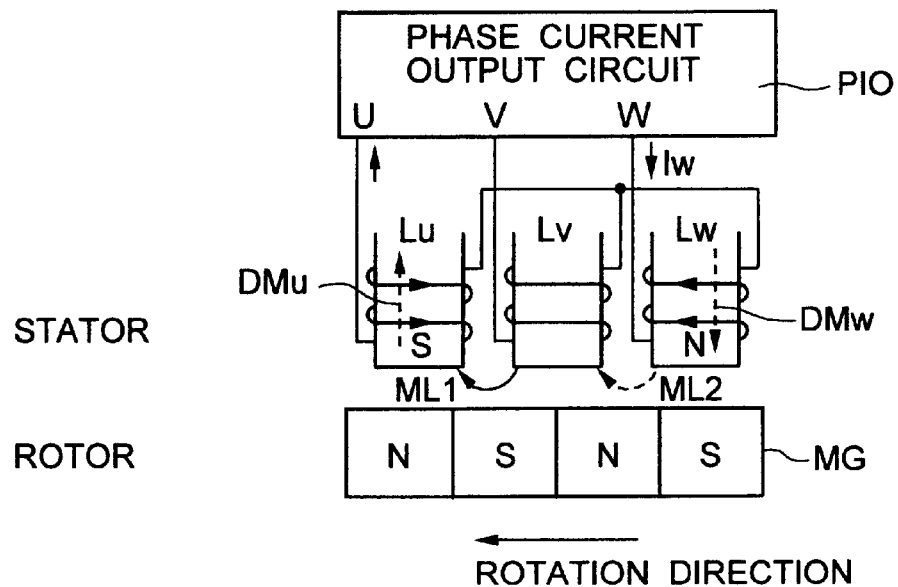
FIGS. 2a and 2b are schematic diagrams illustrating the principle of a rotor position detecting method according to one embodiment of the present invention, in each of which diagrams the rotor is at a standstill with the border between an S pole and an N pole of the magnet of the rotor shifted a little from the center of the field coil Lv to the field coil Lw of the stator.
Figure 2B:
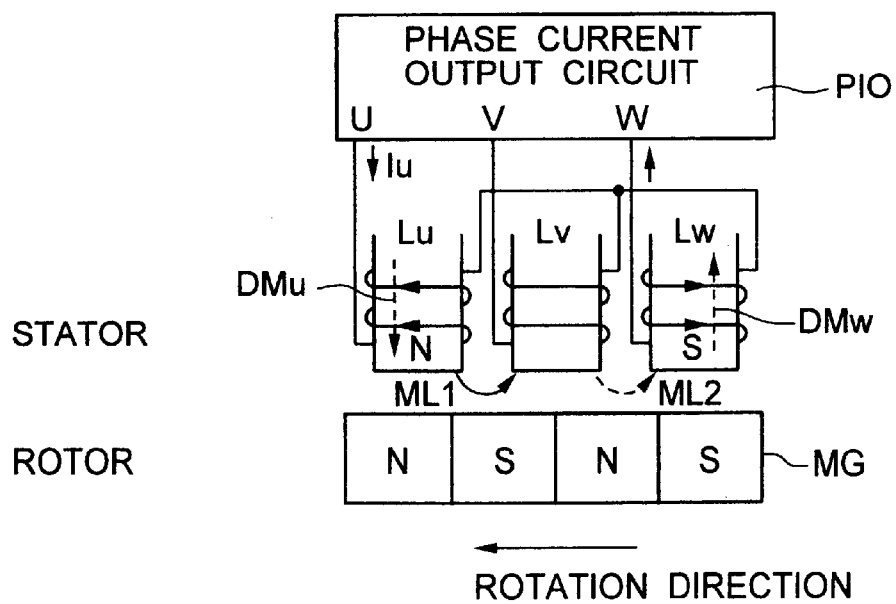

On the other hand, as in FIG. 2a, under the condition that the rotor is at a standstill with the border between an S pole and an N pole of the rotor magnet MG being shifted a little from the center of the field coil Lv to the field coil Lw of the stator, the direction in which the current is supplied is reversed, and a short pulse current Iu is conducted from the phase current output terminal U to the phase current output terminal W as shown in FIG. 2b. Though the density of the flux emerging from the rotor magnet MG and then passing through the field coil Lu and the density of the flux emerging from the rotor magnet MG and then passing through the field coil Lw are the same as in FIG. 2a, the directions of the magnetic lines produced by the field coils Lu and Lw are opposite to the directions of the magnetic lines emerging from the N poles and going into the S poles of the magnet MG of the rotor that respectively face the field coils. In addition, the magnetic lines of the field coil Lu are set off by the N pole of the rotor magnet MG to a greater extent than the magnetic lines of the field coil Lw are set off by the S pole. Therefore, the leakage flux ML1 from the field coil Lu to the field coil Lv is smaller than the leakage flux ML2 from the field coil Lw to the field coil Lv, but because the directions of the leakage fluxes ML1 and LM2 are reverse from those in FIG. 2a, the polarity of the voltage induced in the Lv by the difference in leakage flux is the same as in FIG. 2a.

Moreover, in the above case, the voltage induced in the field coil Lv is greater when a current is sent such that the magnetic lines produced by the field coils Lu and Lv are in the same direction as the magnetic lines of the rotor magnet MG as in FIG. 2a than when a current is sent such that the magnetic lines produced by the field coils Lu and Lv are in the opposite direction to the direction of the magnetic lines of the rotor magnet MG. Therefore, by passing a current through the field coils Lu and Lw alternately in opposite directions, detecting and comparing the voltage induced in the field coil Lv, it is possible to determine which poles are close to which field coils and whether the poles are north or south.

Figure 3A:
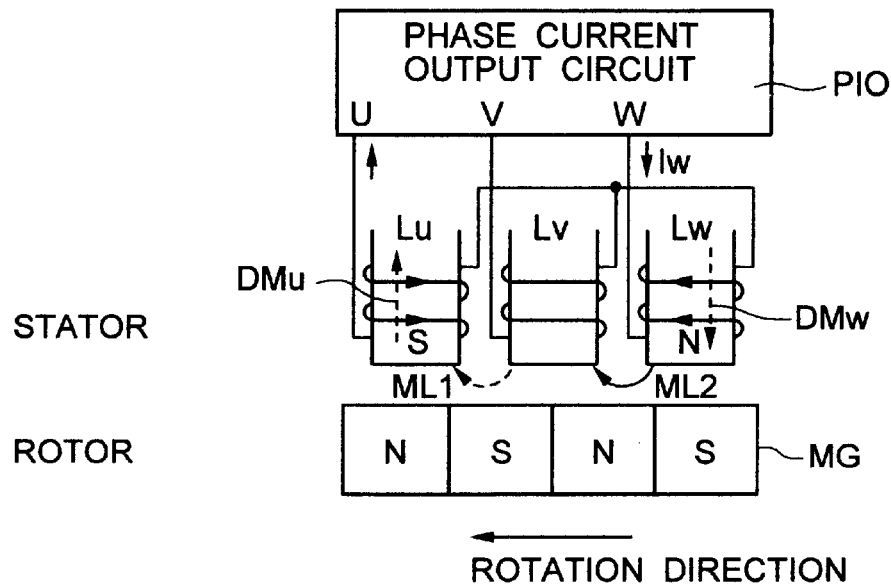
FIGS. 3a and 3b are schematic diagrams illustrating the principle of a rotor position detecting method according to one embodiment of the present invention, in each of which diagrams the rotor is at a standstill with the border between an S pole and an N pole of the magnet of the rotor shifted a little from the center of the field coil Lv to the field coil Lu of the stator.

FIG. 3a shows the state that the rotor is at a standstill with the border between an S pole and an N pole of the magnet MG of the rotor being shifted a little away from the center of the field coil Lv of the stator to the field coil Lu. Under this condition, because the S pole of the rotor magnet MG squarely faces the front side of the field coil Lw, the density of the flux emerging from that portion of the rotor magnet MG which faces the field coil Lw and then passing through the field coil Lw is higher than the density of the flux emerging from that portion of the rotor magnet MG which faces the field coil Lu and passing through the field coil Lu. Therefore, when a short pulse current Iw is supplied from the phase current output terminal W to the phase current output terminal U, the magnetic lines DMw produced by field coil Lw are in the same direction as the above-mentioned flux (magnetic lines) emerging from that portion of the rotor magnet MG which faces the field coil Lw and passing through the field coil Lw and also the magnetic lines DMu produced by the field coil Lu are in the same direction as the above-mentioned flux (magnetic lines) emerging from that portion of the rotor magnet MG which faces the field coil Lu and passing through the field coil Lu. However, owing to the above-mentioned difference in flux density, the leakage flux ML2 from the field coil Lw to the field coil Lv is larger than the flux ML1 from the field coil Lu to the field coil Lv and the voltage is induced in the field coil Lv according to the difference in leakage flux. The voltage induced in the field coil Lv in FIG. 3a is opposite in polarity to the voltage induced in the field coil Lv in FIGS. 2a and 2b.

Figure 3B:
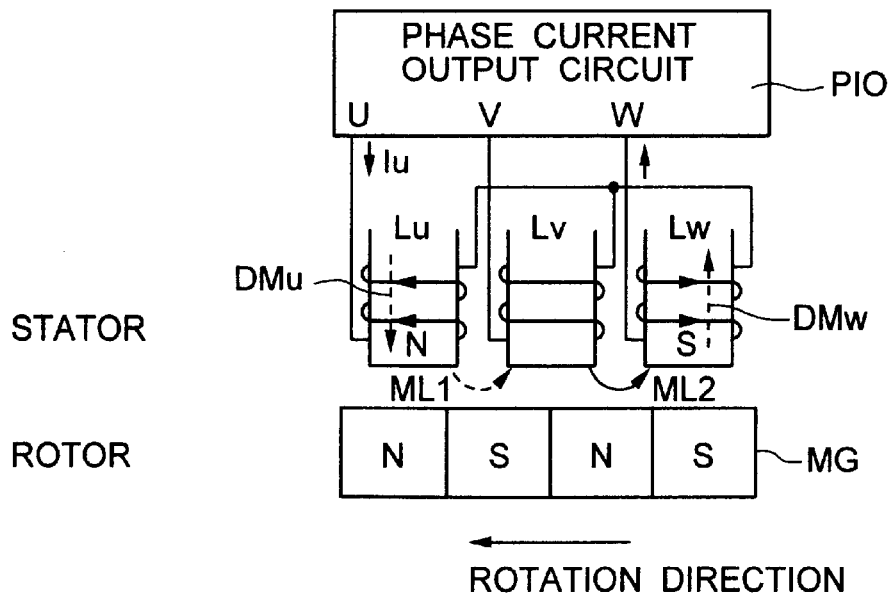

When the direction of current flow is reversed and a short pulse current is conducted from the phase current output terminal U to the phase current output terminal W as shown in FIG. 3b, the density of the flux emerging from the rotor magnet MG and passing through the field coil Lw is the same as the density of the flux emerging from the rotor magnet MG and passing through the field coil Lu as in FIG. 3a, but the magnetic lines produced by the field coils Lw and Lu are respectively opposite in direction to the magnetic lines from the S and the N poles of the rotor magnet MG facing those field coils. Moreover, the magnetic lines produced by the field coil Lw are set off by the S pole of the rotor magnet MG to a greater extent than the magnetic lines produced by the field coil Lu are set off by the N pole of the rotor magnet MG. Therefore, though the leakage flux ML2 from the field coil Lw to the field coil Lv is smaller than the leakage flux ML1 from the field coil Lu to the field coil Lv, because the direction of the magnetic lines ML1 and ML2 is opposite to that in FIG. 3a, the polarity of the voltage induced in the field coil Lv according to the difference in leakage flux is the same as in FIG. 3a.

In addition, the voltage induced in the field coil Lv is larger when a current is supplied such that the magnetic lines produced are in the same direction as the magnetic lines of the rotor magnet MG as shown in FIG. 3a as in FIGS. 2a and 2b than when a current is supplied such that the magnetic lines produced by the field coils Lu and Lv are respectively opposite in direction to the magnetic lines of the rotor magnet MG as shown in FIG. 3b. Therefore, also in this case, by passing a current through the field coils Lu and Lw alternately in opposite directions, detecting and comparing the voltage induced in the field coil Lv, it is possible to determine which poles are close to which field coils and whether the poles are north or south. Note that the polarity of the greater one of the leakage fluxes detected is opposite to that detected in the case of FIG. 2.

Figure 4A:
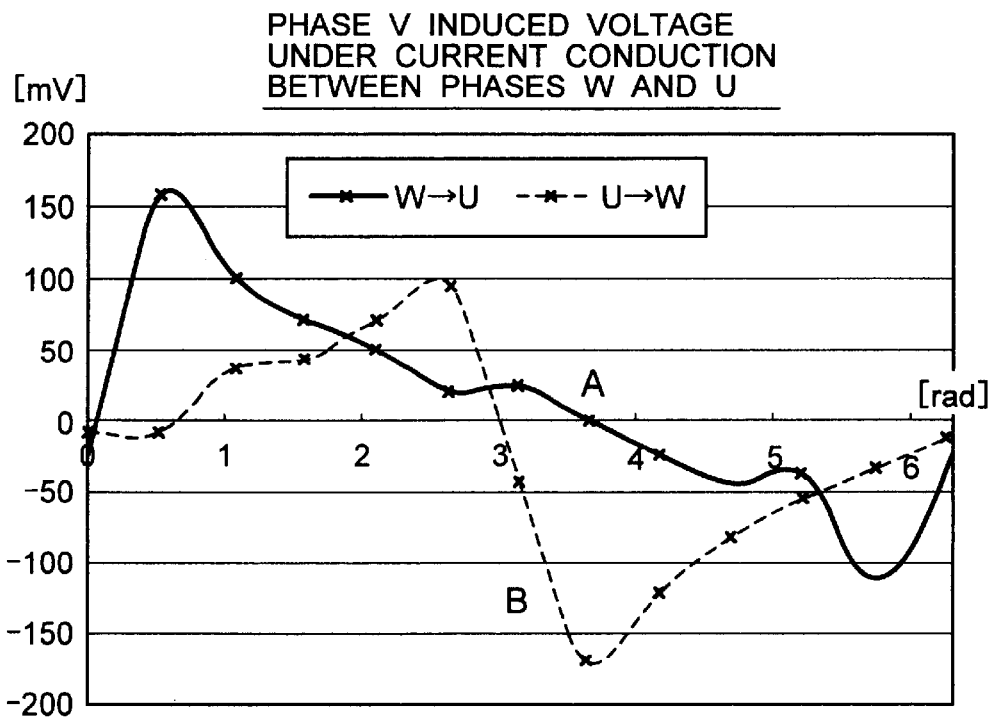
FIGS. 4a and 4b are graphs showing the relation between the position of the rotor relative to the stator and induced voltages at the non-conducting phases, obtained by an experiment conducted by the present inventors.

FIG. 4a shows a result of a test conducted by the inventors. The vertical axis indicates the detected values of the induced voltage and the horizontal axis indicates the position of the rotor with respect to the stator expressed in electrical angles. For example, in a motor with a 12-pole rotor, a mechanical angle of 60 degrees corresponds to an electrical angle of 360 degrees. In other words, FIG. 4a shows the result of measurement of voltages induced in the field coil Lv by passing a current through the field coils Lu and Lw alternately in opposite directions.

Figure 4B:
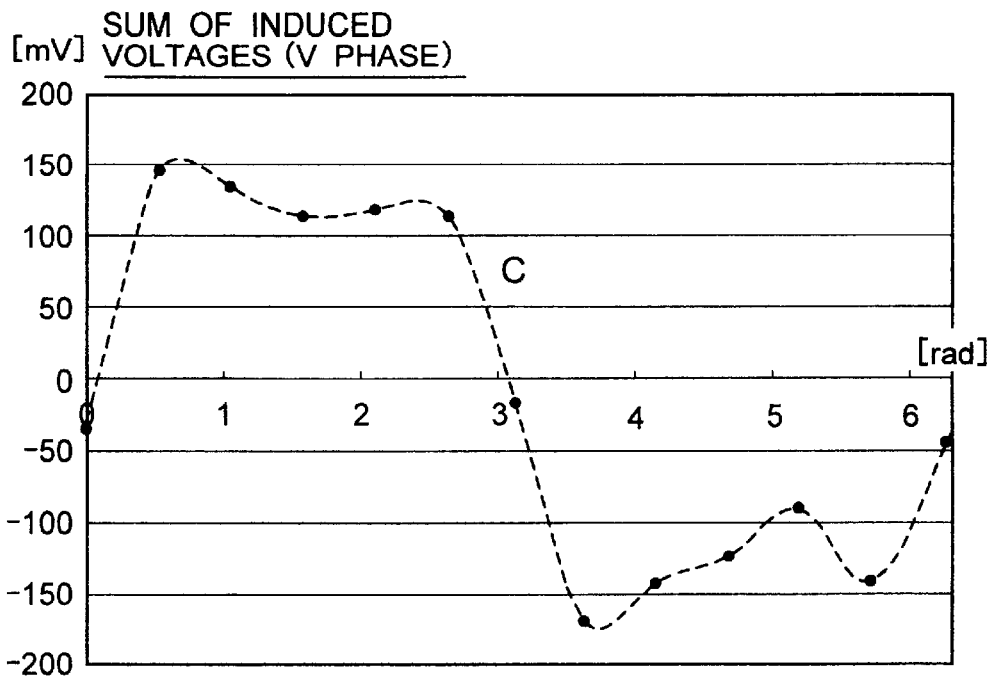

In FIG. 4a, the solid line A indicates the induced voltage in the field coil Lv when a current is conducted from the field coil Lw to the field coil Lu and the broken line B indicates the induced voltage in the field coil Lv when a current is conducted from the field coil Lu to the field coil Lw. From FIG. 4a, one of the zero-cross points of the two curves (A and B) is not clear, in other words, it is difficult to uniquely determine the positional relation between the rotor and the stator from induced voltages detected when a current was sent in one direction. Therefore, if an attempt is made to determine the rotor position from induced voltages by a current supplied in one direction, errors are likely to occur. So, the inventors combined (add up) the above two curves by way of trial, and found as indicated by the broken line C in FIG. 4b that the zero-cross points became clear and the rotor position can be determined with high accuracy.

According to an aspect of the present invention, the present invention is based on an idea of providing the brushless motor drive circuit with a circuit for determining a pair of phases at which current conduction is started by conducting a pulse current through two field coils alternately in opposite directions, combining (adding) the voltages induced in the non-conducting-phase field coil by respective currents and sampled and held by a sample-and-hold circuit, or integrating and then adding up the respective induced voltages, and on the basis of the sum, detecting the polarities of the induced voltages.

Figure 5:
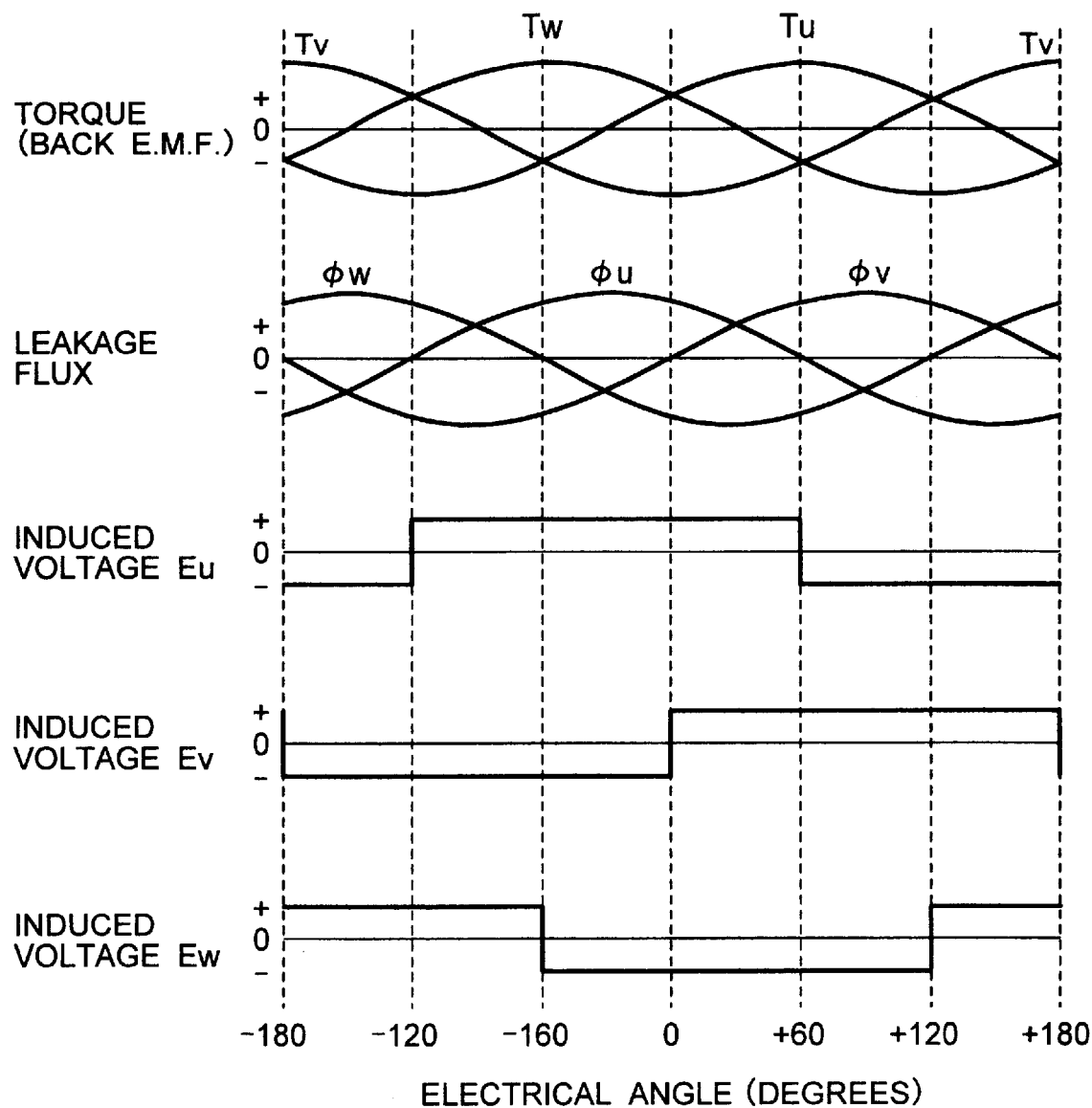
FIG. 5 is a waveform diagram with respect to a three-phase motor, showing a relation between detection results on the positive and negative polarities of induced voltages Eu, Ev and Ew detected at the field coils Lu, Lv and Lw and leakage fluxes to the non-conducting phases, and showing a relation between leakage fluxes to the non-conducting phases and torques (back electromotive forces) of the respective field coils Lu, Lv and Lw when the motor is rotating.

FIG. 5 shows with regard to a three-phase motor the relation between detected polarities (positive and negative) of the induced voltages Eu, Ev and Ew detected at the field coils Lu, Lv and Lw and the leakage fluxes φu, φv and φw to the non-conducting-phase field coils, and the relation between the leakage fluxes φu, φv and φw to the non-conducting-phase field coils and the torque Tu, Tv and Tw, namely, the back electromotive forces of the field coils Lu, Lv and Lw while the motor was at a standstill.

If the polarity-detecting results for the detected induced voltages Eu, Ev and Ew when the motor is at a standstill are "+, +, −" for example, by conducting a current from the u-phase field coil Lu to the v-phase field coil Lv to start the motor, the maximum torque can be obtained. It is understood from FIG. 5 that the positions where the polarities of the induced voltages are inverted coincide with the positions where the polarities of the leakage fluxes are inverted and it never occurs that detection about the polarity of induced voltages is unclear. Moreover, because the leakage flux is proportional to the flux density in the field coil, it is not always required to make magnetic saturation occur in the field coil when detecting an induced voltage. Therefore, it is possible to make this determination by passing a smaller pulse current as compared with one of the conventional control methods in which a determination is made on a pair of phases at which to start current conduction by detecting the rotor position based on differences in current rise time constant.

Table 1 shows the relation between the polarity detection results for the combined induced voltages Eu, Ev and Ew and the phases for starting current conduction. Obviously, the relation in Table 1 corresponds to the relation shown in FIG. 5. After the polarity detection result is obtained, by arranging for a determination to be made on a pair of phases at which to start current conduction with reference to Table 1, the motor can be started in the correct rotating direction in a shortest time regardless of the rotor position at the moment. The polarity (positive or negative) detection results of the induced voltages Eu, Ev and Ew can never be all "+" or all "−" when induced voltages are detected normally at the field coils of the respective phases. Therefore, if such detection results are given, this should be regarded as caused by detection errors and detection should be carried out over again.

TABLE 1

| | INDUCED VOLTAGE | | | START CURRENT CONDUCTION PHASES (DIRECTION OF |
|---|---|---|---|---|
| | EU | Ev | EW | CURRENT FLOW) |
| DETECTION RESULT | negative | negative | positive | phase v → phase u |
| | positive | negative | positive | phase w → phase u |
| | positive | negative | negative | phase w → phase v |
| | positive | positive | negative | phase u → phase v |
| | negative | positive | negative | phase u → phase w |
| | negative | positive | positive | phase v → phase w |

Meanwhile, in a real motor, even if the rotor and the stator are in the positional relation shown in FIGS. 1a and 1b, in other words, even if the center of the field coil Lv coincides with the border between an S pole and an N pole of the rotor, when a current is passed through the field coils Lu and Lw, the leakage flux from either one of those field coils to the field coil Lv is greater than the leakage flux from the other coil due to, for example, variation in winding of the coils, and a voltage proportional to a difference in leakage flux is induced in the field coil Lv. However, in FIG. 1a, a current is supplied such that the magnetic lines of the field coils are in the same direction as the magnetic lines of the rotor magnet, whereas, in FIG. 1b, a current is supplies such that the magnetic lines of the field coils are in the opposite direction to the magnetic lines of the rotor magnet. Therefore, in these two cases, the voltages induced in the field coil Lv ascribable to variation in winding are mutually opposite in polarity, and when these induced voltages are added together, they cancel each other and become zero.

Figure 6:
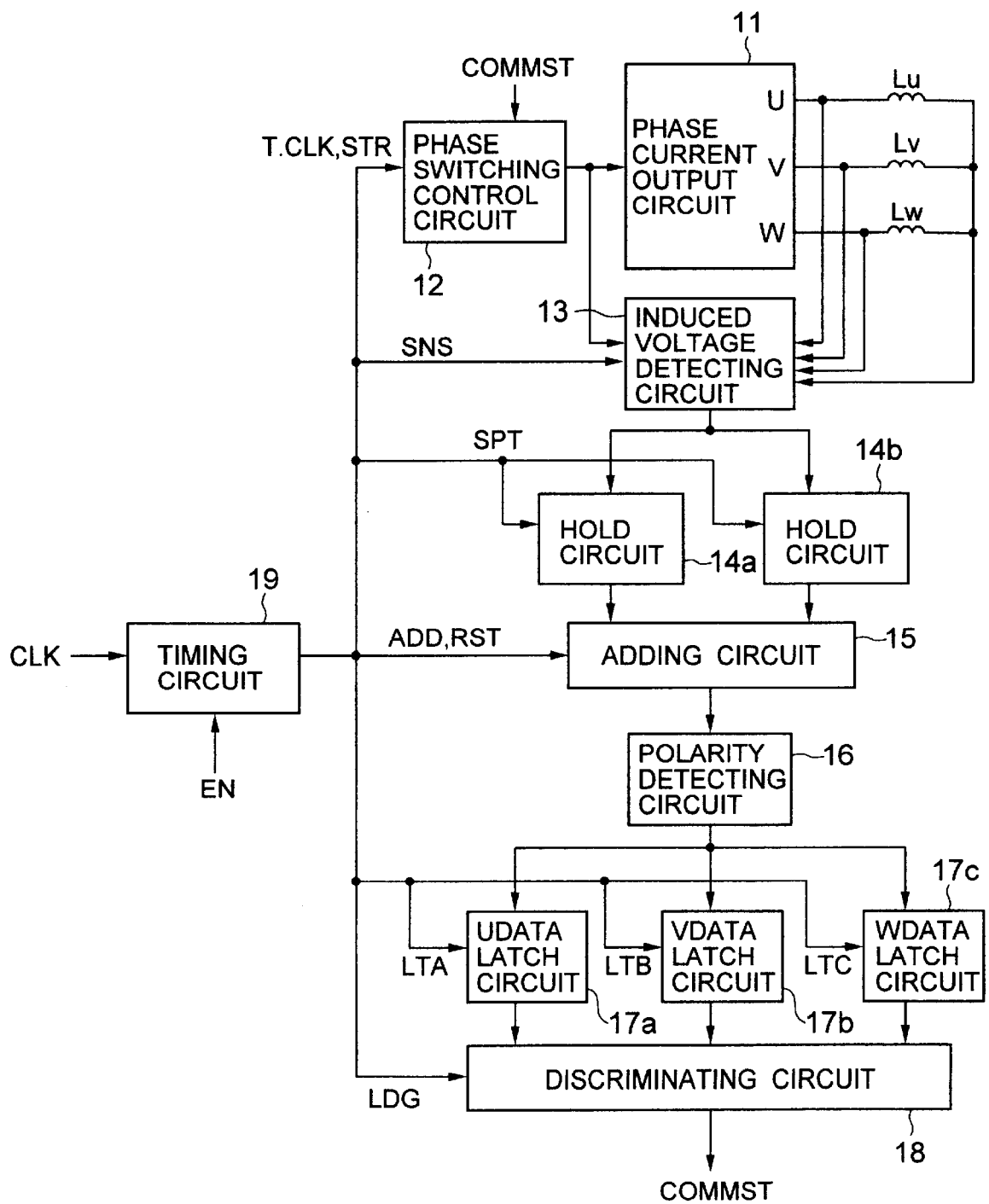
FIG. 6 is a block diagram of brushless motor drive control apparatus according to one embodiment of the present invention in a motor driver unit used in a hard disk storage device.

FIG. 6 shows a brushless motor drive control apparatus mounted in a motor driver unit for use in a hard disk device and structured according to one embodiment of the present invention.

In FIG. 6, reference numeral 11 denotes a phase current output circuit that supplies current to the field coils Lu, Lv and Lw in a three-phase brushless motor, 12 denotes a phase switching control circuit that supplies a selection signal of the phases, through which a current is to be passed, to the phase current output circuit 11, 13 denotes an induced voltage detecting circuit, connected to the output terminals U, V and W of the phase current output circuit 11, for detecting induced voltages, 14a and 14b denote sample-and-hold circuits for sampling and holding the induced voltages detected by the induced voltage output circuit 13 when the field coils are supplied with a current in two opposite directions, and 15 denotes an adder circuit that adds up the voltages held in the sample-and-hold circuits 14a and 14b and generates a rotor position signal.

Reference numeral 16 denotes a polarity detecting circuit for detecting the polarity of an addition result in the adder circuit 15, in other words, detecting whether the sum of voltages is positive or negative, and generating a polarity signal, 17a, 17b and 17c denote data latch circuits for storing polarity data representing polarity signals generated by the polarity detecting circuit 16 when a current is passed through the field coils, 18 denotes a discriminating circuit for determining rotor position, in other words, a pair of phases through which a current is to be supplied in the first place based on polarity data stored in the data latch circuits 17a, 17b and 17c, from the relation in Table 1, for example, and generating a phase selection setting signal, 19 denotes a timing circuit that generates control signals based on a clock signal CLK, and outputs to the circuit blocks 11 to 18.

The timing circuit 19 supplies a phase selection switching timing signal T.CLK and a rotor position detection ON/OFF signal STR to the phase switching control circuit 12, an ON/OFF signal SNS to the induced voltage detecting circuit 13, a sampling timing signal SPR to the sample-and-hold circuits 14a and 14b, an operation timing signal ADD and a reset signal RST to the adder circuit 15, latch timing signals LTA to LTC to the data latch circuits 17a, 17b and 17c, a determinination timing signal JDG to the discriminating circuit 18. The circuit blocks 11 to 18 operate sequentially by control signals from the timing circuit 19.

By provision of this timing circuit 19, it becomes possible to realize a drive control apparatus which can start a brushless motor in a short time by determining by itself a pair of phases at which to start current conduction when a clock signal is only given without control signals being generated and supplied externally.

When the ON/OFF signal STR issued from the timing circuit 19 is at its effective level, the phase switching control circuit 12 sends a phase selection control signal to the phase current output circuit 11 to detect the rotor position and pass a small-pulse current through the field coils. In response to the phase selection control signal from the phase-switching control circuit 12, the phase current output circuit 11 sends a pulse current, having such a short duration as the rotor does not react, to any pair of field coils Lu, Lv and Lw in one direction or in the opposite direction. On the other hand, when the phase switching control circuit 12 receives a phase selection setting signal COMMST indicating the phases at which to start current conduction, from the discriminating circuit 18, the phase switching control circuit 12 sends a phase selection control signal to the phase current output circuit 11 directing it to pass a pulse current through the set phases at which to start current conduction to rotate the motor. At this time, the ON/OFF signal STR from the timing circuit 19 is at the effective level.

The induced voltage detecting circuit 13 has a rotor position detecting action ON/OFF signal SNS supplied from the timing circuit 19 and also has another signal, indicating which phases are being selected, supplied from the phase switching control circuit 12. By those signals, the induced voltage detecting circuit 13 detects and amplifies the voltage induced in the non-conducting-phase coil. The induced voltage detecting circuit 13, if formed by a MOSFET, may include a switch (selector) to select a voltage of the non-conducting phase, where current is not flowing, out of the output terminals U, V and W of the phase current output circuit 11 and also an amplifier circuit to amplify the selected voltage. If formed by a bipolar transistor, the induced voltage detecting circuit 13 may include three differential amplifiers that each have at one input terminal supplied with one of the voltages of the output terminals U, V and W of the phase current output circuit 11 and at the other input terminal supplied with the potential at the common connection node N0 of the respective field coils. When the induced voltage detecting circuit 13 is formed by three differential amplifier circuits, the circuit 13 may be configured such that any one of the differential amplifier circuits performs amplification when its current source is turned on by a phase selection control signal.

The adder circuit 15 may be an analog adder circuit using an operational amplifier or may be a digital adder circuit. In the case of a digital adder, it is only necessary to insert an A/D converter circuit as the stage subsequent to the sample-and-hold circuits 14a and 14b. The polarity detecting circuit 16 may be an analog or digital circuit depending on the type of the adder circuit 15. If the adder 15 is formed as a digital circuit, the polarity detecting circuit 16 may be formed by a subtractor. In place of the sample-and-hold circuits 14a and 14b, registers may be used, and an A/D converter circuit may be provided at the preceding stage to have the detected induced voltage converted into a digital value and stored as digital data in the registers.

In the above embodiment, the discriminating circuit 18 that designates start current conduction phases from a polarity detection result is mounted together with the induced voltage detecting circuit 13, etc. However, it is possible to provide a microcomputer that receives polarity data from the latch circuits 17a to 17c, which hold data from the polarity detecting circuit 16, and determines a pair of phases at which to start current conduction and sets the phase data in the phase switching control circuit 12.

Figure 7:
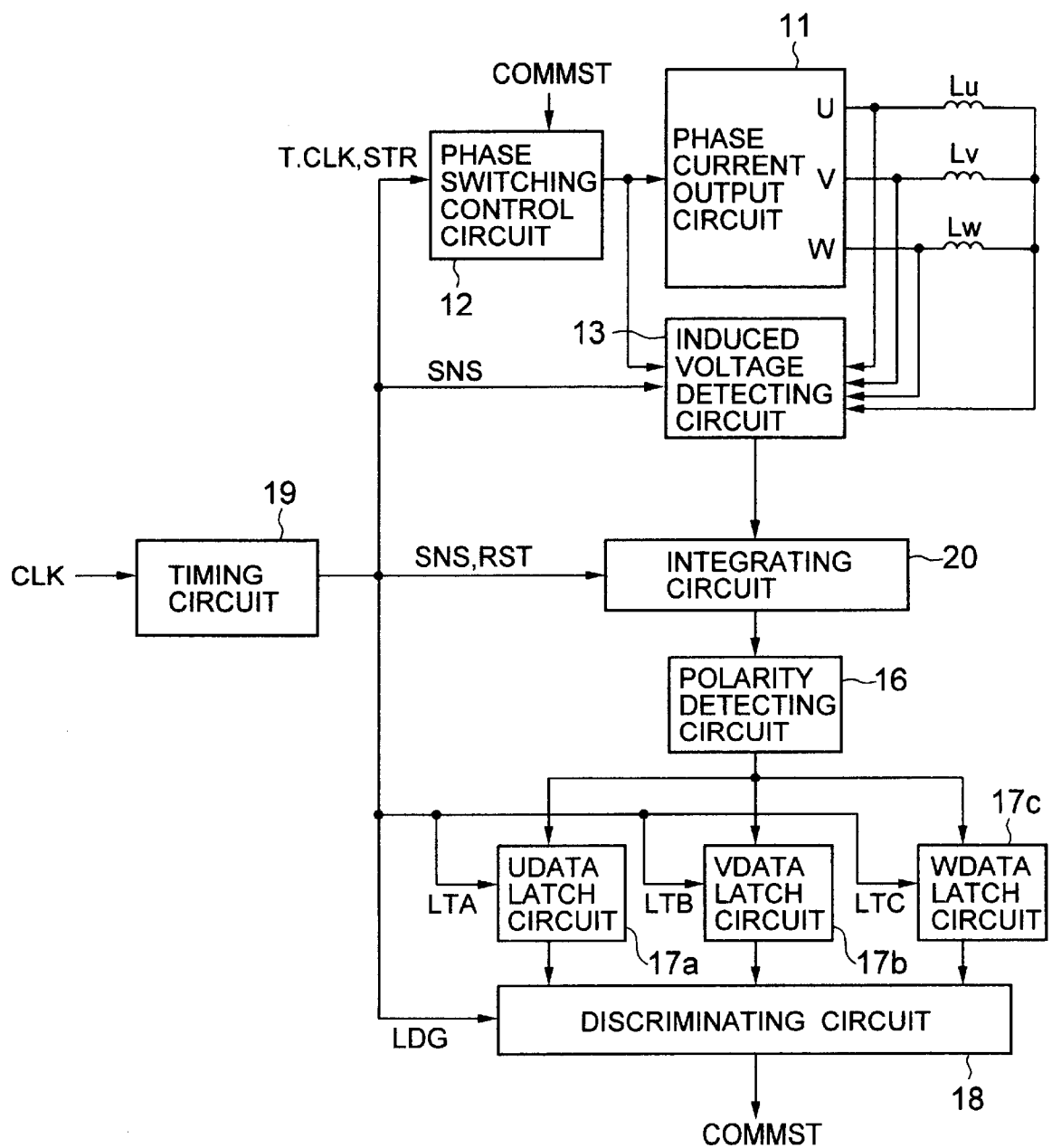
FIG. 7 is a block diagram of a brushless motor drive control apparatus according to one embodiment of the present invention in a motor driver unit used in a hard disk storage device.

FIG. 7 shows a motor drive control apparatus in a motor driver unit, which is used in a hard disk storage device and which is structured according to another embodiment of the present invention.

This embodiment uses an integrating circuit 20, which has replaced the sample-and-hold circuits 14a and 14b and the adder 15 in the embodiment shown in FIG. 6. This integrating circuit 20 may be formed by a well-known integrating circuit including a CR integrating circuit made of a capacitor and a resistance, or by a well-known integrating circuit including an operational amplifier and a capacitor connected between an output terminal and an inverted input terminal of the amplifier.

In this embodiment, by a control signal from the timing circuit 19, the integrating circuit integrates an induced voltage which is detected at the non-conducting phase by the induced voltage detecting circuit 13 when a pulse current is passed through the field coils in one direction in the first place and, under the condition that the result of integration is maintained, also integrates an induced voltage which is detected at the non-conducting phase by the induced voltage detecting circuit 13 when a pulse current is passed through the field coils in the opposite direction. The polarity detecting circuit 16 is used to detect the polarity of the electric charge remaining in the capacitor as a component part of the integrating circuit (hereafter referred to as an integrating capacitor). After this determination is made, control is performed so that the integrating capacitor is reset once, and then a pulse current is passed through a subsequent pair of field coils, and the induced voltage detected is integrated.

Figure 8:
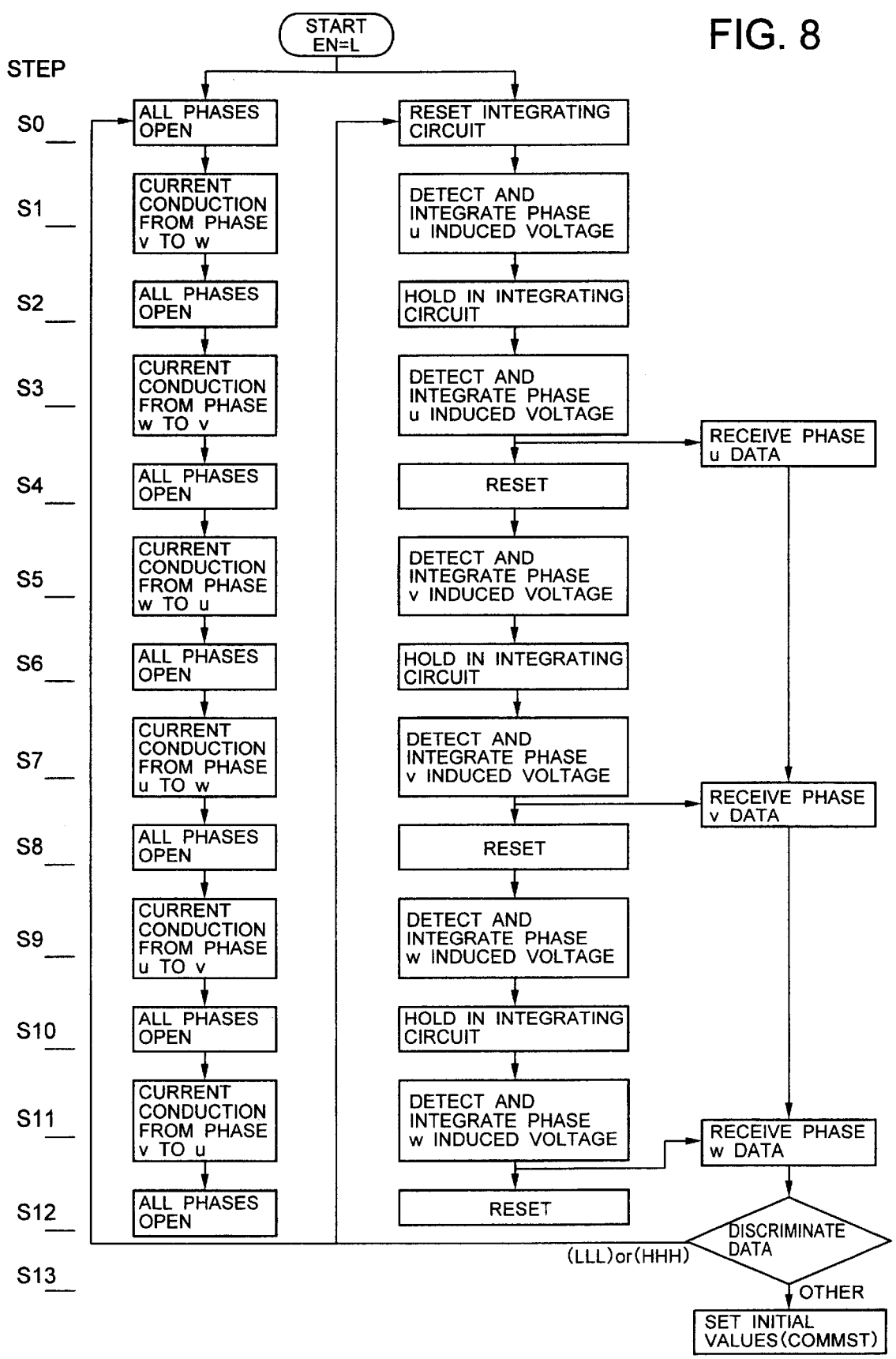
FIG. 8 is a flowchart showing the operation procedure of the apparatus in FIG. 7.

Description will be made of the operation of the motor drive control apparatus in FIG. 7 with reference to a flowchart in FIG. 8. FIG. 8 shows the operation procedures of the phase current output circuit 11 at left and the induced current detecting circuit 13 and the integrating circuit 20 at right to show the related actions compared with each other.

When the enable signal EN (Refer to FIGS. 9 and 10) from a control circuit is asserted to the low level, the timing circuit 19 starts to generate a control signal for detecting the rotor position. With this action got started, in the first step S0, while the output terminals of the phase current output circuit 11 are in high impedance state in which the terminals are all opened, that is, no current is output from any phase output terminal, the capacitor of the integrating circuit 20 is reset, more simply, the capacitor discharges itself of electric charge. Next, a pulse current is passed from the phase v to the phase w by the phase current output circuit 11. The pulse current used has so short a duration as the rotor does not react to it. The induced voltage of the phase u, which is non-conducting at this moment, is detected by the detecting circuit 13, and is integrated by the integrating circuit 20 (Step S1).

Subsequently, in a step S2, all phase terminals of the phase current output circuit 11 are opened, and for this while the voltage integrated in the integrating circuit 20 is held. In the next step S3, the phase current output circuit 11 sends a pulse current from the phase w to the phase v in the opposite direction to the current flow in the step S1. At this time, the induced voltage of the phase u in the non-conducting state is detected by the induced voltage detecting circuit 13, and the phase-u induced voltage is integrated using the result of the previous integration as the initial value. Accordingly, in the integrating capacitor, the integration result of the phase-u induced voltage when a current was passed from the phase v to the phase w is added with the integration result of the phase-u induced voltage when a current was passed from the phase w to the phase v.

In the step S4, the polarity of the electric charge remaining in the integrating capacitor is detected by the polarity detecting circuit 16, and a detection decision result u-DATA is stored in the first circuit 17a. All the output terminals of the phase current output circuit 11 are opened, and in the integrating circuit 20, the electric charge held in the integrating capacitor is reset. In a step S5, the phase current output circuit 11 passes a pulse current from the phase w to the phase u. At this time, the induced voltage of the phase v, which is not conducting, is detected by the detecting circuit 13, and the induced voltage is integrated by the integrating circuit 20.

In a step S6, the voltage integrated by the integrating circuit 20 is held, and all output terminals of the phase current output circuit 11 are opened. In the next step S7, the phase current output circuit 11 passes a pulse current from the phase u to the w phase in the direction opposite from the the direction in the step S5, the induced voltage of the phase v, which is not conducting, is detected by the detecting circuit 13, and the integrating circuit 20 integrates the phase-v induced voltage using the previous integration result as the initial value.

Subsequently, in a step S8, after twice integration, the polarity of the charge remaining in the integrating capacitor is detected by the polarity detecting circuit 16. The detection result v-DATA in the second data latch circuit 17b. In addition, all phase terminals of the phase current output circuit 11 are opened, and the charge held in the integrating capacitor in the integrating circuit 20 is reset.

In steps S9 to S11, as in the above-mentioned steps S5 to S7, the phase current output circuit 11 passes a pulse current from the phase u to the phase v, the induced voltage of the phase w, which is not conducting, is detected by the detecting circuit 13, and is integrated by the integrating circuit 20. Subsequently, a reverse pulse current is passed from the phase u to the phase v, the induced voltage of the phase w, which is not conducting, is detected by the detecting circuit 13, and the phase-w induced voltage is integrated by the integrating circuit 20.

In the next step S12, from results of twice integration in the integrating circuit 20, the polarity of the charge remaining in the integrating capacitor is detected by the polarity detecting circuit 16, and a detection result w-DATA is stored in the third data latch circuit 17c. All phase output terminals of the phase current output circuit 11 are opened, and the charge held in the integrating capacitor is reset in the integrating circuit 20.

After this, in a step S13, the discriminating circuit 18 determines the position of the rotor based on detection results u-DATA, v-DATA and W-DATA stored in the data latch circuits 17a, 17b and 17c in the steps S3, S7 and S11.

More specifically, the discriminating circuit 18 determines the rotor position according to Table 1 from three pieces of information indicating the positive or negative polarity stored in the data latch circuits 17a, 17b and 17c, and, from the rotor position, determines the phases at which current conduction is started, and sends a phase selection setting signal COMMST to the phase switching control circuit 12 to initialize the current conduction phases.

In determining the rotor position in the step S13, it is improbable that the polarity detection results (positive or negative) stored in the data latch circuits 17a, 17b and 17c are all "+" (H) or all "−" (L) and, therefore, if such a combination of results occurs, they should be regarded as detection errors, and the process shown in FIG. 8 returns to the step S0 to perform rotor position detection. In a motor drive control apparatus in the embodiment shown in FIG. 7, when the apparatus is operated in synchronism with a clock signal CLK with a frequency of 3.5 kHz, for example, the steps S0 to S13 can be finished in a time as short as 2 msec. Therefore, even if the rotor position detection is carried out over again, this has hardly any effects on the starting time of the motor that takes several tens of msec.

Figure 9:
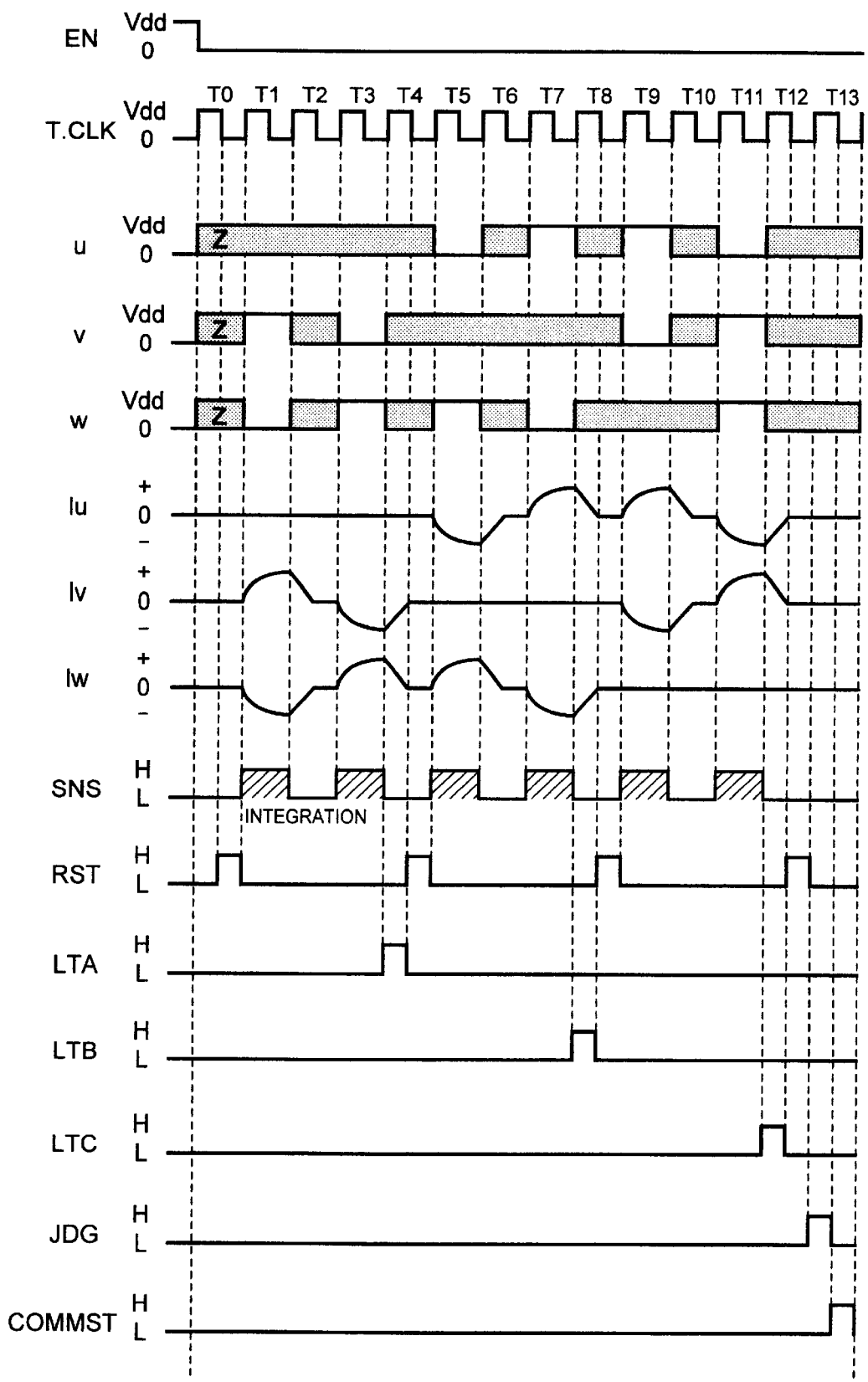
FIG. 9 is a timing chart showing the operation of the apparatus in FIG. 7 determining the rotor position by conducting a pulse current through the field coils of respective phases and detecting induced voltages at the non-conducting phases according to the procedure shown in FIG. 8.

FIG. 9 is a timing chart when the rotor position is detected by supplying a pulse current to the respective phases sequentially and detecting the induced voltages at the non-conducting phases according to the above-mentioned procedure. In FIG. 9, u, v and w denote the output voltages of the phases of the phase current output circuits 11, Iu, Iv and Iw denote the currents that flow in the field coils Lu, Lv and Lw, SNS denotes an ON/OFF control signal for integrating actions to the integrating circuit 20, RST denotes a reset signal to discharge the charge of the integrating capacitor, LTA, LTB and LTC denote signals for giving latch timing to the data latch circuits 17a, 17b and 17c, JDG denotes a signal for giving discrimination timing to the discriminating circuit 18, and COMMST denotes a timing signal which the discriminating circuit 18 issues to initialize the phase selection in the phase switching control circuit 12 based on a discrimination result. Clock cycles T0 to T13 in FIG. 9 respectively correspond to steps S0 to S13 in the flowchart in FIG. 8.

Figure 10:
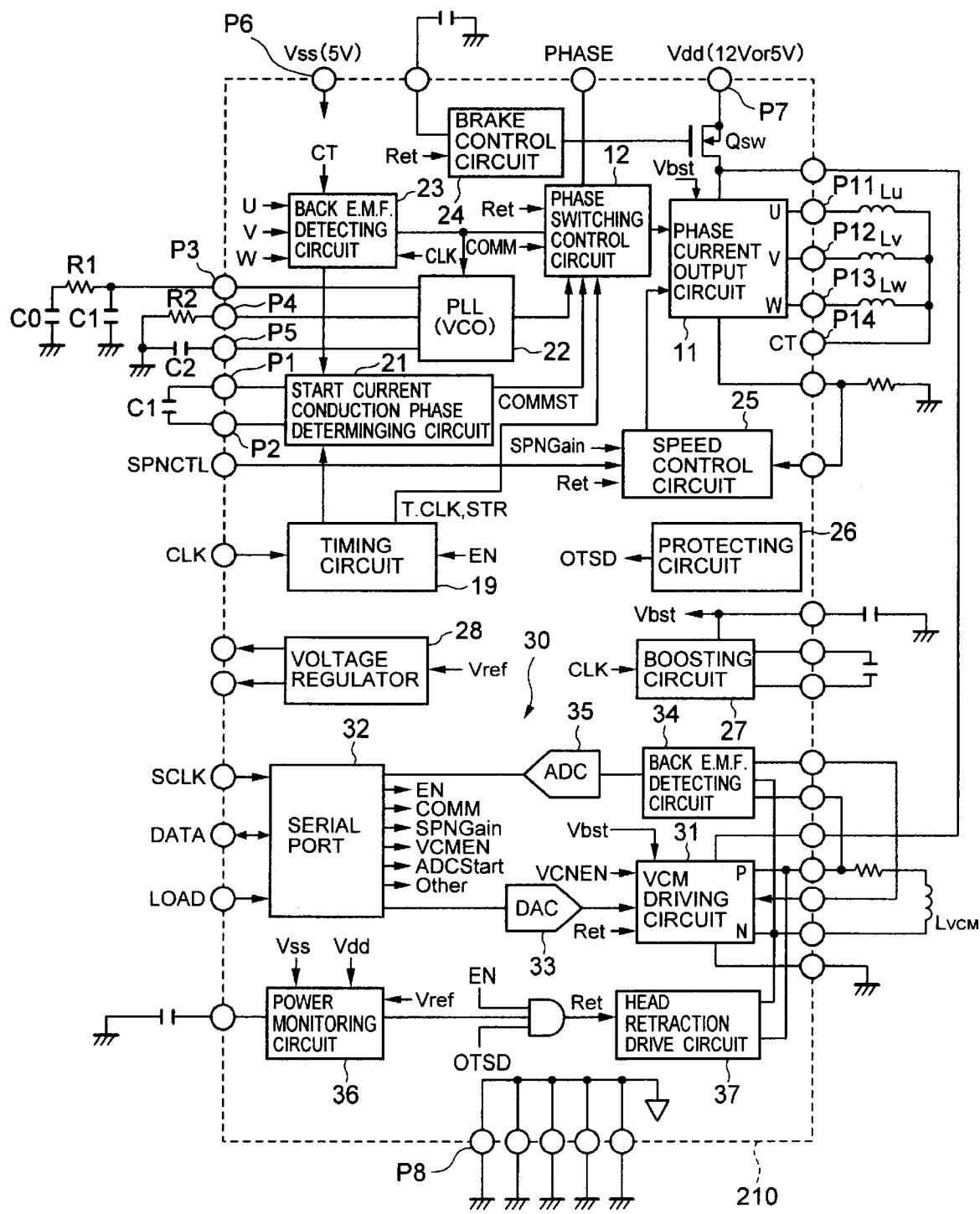
FIG. 10 is a block diagram for explaining the motor driver unit, which is used in a hard disk storage device and which includes the brushless motor drive control apparatus according to one embodiment of the present invention.

FIG. 10 shows an example of system configuration including a motor driver unit, which includes a motor drive control apparatus according to another embodiment of the present invention, and which is used in a hard disk storage device. The circuit blocks and circuit elements located in a range enclosed by a broken line 210 in FIG. 10 are formed on one semiconductor substrate, such as a single crystal silicon chip, but they are not to be construed as restrictive.

In FIG. 10, the circuits designated by the same reference numerals as in FIG. 7 are the circuits, which have or include the same functions. Specifically, reference numeral 11 denotes a phase current output circuit that selectively and sequentially supplies current to the three-phase field coils Lu, Lv and Lw of a spindle motor to rotate the disks of a hard disk device, 12 denotes a phase switching control circuit to supply to the phase current output circuit 11 a signal for selection of the phases through which to pass a current (phase selection control signal), 19 denotes a timing circuit to generate control signals to the above-mentioned circuit blocks 11 through 18 based on a clock signal CLK.

In this embodiment, out of the circuit blocks shown in FIG. 7 (or FIG. 6), the induced voltage detecting circuit 13, connected to the output terminals U, V and W of the phase current output circuit 11, for detecting the induced voltages, the integrating circuit 20 (or sample-and-hold circuits 14a and 14b, and an adder 15) for integrating induced voltages detected by the induced voltage detecting circuit 13, the polarity detecting circuit 16 for detecting the polarity of integration results (or addition results), the data latch circuits 17a, 17b and 17c for storing polarity detection results, and the discriminating circuit 18 for discriminating the rotor position, that is, a pair of phases through which a current is conducted in the first place from detection results stored in the data latch circuits 17a, 17b and 17c are collectively shown as a single start current conduction phase determining circuit 21.

In this embodiment, the start current conduction phase determining circuit 21 is connected to external terminals P1 and P2 on the chip, and the terminals P1 and P2 are connected to an externally-mounted discrete capacitor Ci as the integrating capacitor of the integrating circuit. This integrating capacitor serves to eliminate noise in detected voltages in the induced voltage detecting circuit 13 that detects the induced voltages at the non-conducting phases to determine start current conduction phases with high accuracy. This embodiment is particularly effective in a case where the phase current output circuit 11 is formed by a bipolar transistor. This is because large noise is contained in the induced voltages at the non-conducting phases when the phase current output circuit 11 is a bipolar transistor type than when it is a MOSFET type.

In FIG. 10, 23 denotes a back e.m.f. detecting circuit that monitors the voltages at the output terminals U, V and W of the phase current output circuit 11 when they are non-conducting, detects zero-cross points of the back e.m.f., and gives a phase switching timing signal to the phase switching control circuit 12, 22 denotes a PLL (phase locked loop) circuit including a voltage-controlled oscillator (VCO) that generates an oscillating signal required to give phase switching timing to the phase switching control circuit 12 during constant-speed rotation based on an output signal of the back e.m.f. detecting circuit 23, 24 denotes a brake control circuit for forcibly applying an induction brake by shorting all field coils by turning off the power supply switch Qsw of the phase current output circuit 11 when bringing the motor to a stop, and 25 denotes a speed control circuit for controlling the motor speed by detecting the current flowing in the phase current output circuit 11, and, in response to a speed-related command signal SPNCTL from a microcomputer, increasing the rotation speed by increasing the current applied to the phase current output circuit 11 or reducing the speed by decreasing the applied current.

The PLL circuit 22 is connected to external terminals P3, P4 and PS provided on the chip, and the external terminals P3, P4 and PS are connected with externally-mounted elements, such as capacitors C0 and C1 and a resistance R1, which form a loop filter of the PLL, and a capacitor C2 and a resistance R2, which determine an oscillation frequency of the VCO. The parts mounted on the motor driver IC chip 210 include a protecting circuit 26 for detecting the temperature of the chip and bringing the operation of the circuit to a stop, a boosting circuit 27 for boosting the gate voltage to make it possible to sufficiently drive MOSFET's used, a voltage regulator 28 to supply a power source voltage to the IC or LSI provided around the motor driver IC chip 210, and a VCM drive control circuit 30 for driving the voice coil motor to move the magnetic heads, but they should not be construed as restrictive.

The VCM drive control circuit 30 comprises a VCM driving circuit 31 for outputting current to drive the driving coil L VCM of the voice coil motor, a serial port 32 for serial transmission and reception to and from the microcomputer, a D/A converter circuit 33 for converting control data received from the microcomputer into an analog signal and supplying to the VCM driving circuit 31, a back e.m.f. detecting circuit 34 for detecting the back e.m.f. of the coil L VCM to obtain speed information when starting the motor, an A/D converter circuit 35 for converting a detected back e.m.f. into a digital signal, a power supply voltage monitoring circuit 36 for monitoring the levels of power supply voltages Vss and Vdd to detect power cut-off, and a head retraction drive circuit 37 for controlled driving of the coil L VCM to enable the magnetic heads to retract to outside the disk surface when power cut-off is detected.

The above-mentioned serial port 32 sends and receives serial data DATA based on a serial clock SCLK or a load instruction signal LOAD from the microcomputer and generates control signals, such as an enable signal VCMEN to the VCM driving circuit 31 based on data received. The serial port 32 also sends to the microcomputer an A-D converted version of a back e.m.f. induced in the coil LVCM when the motor is started, the back e.m.f. being detected by the back e.m.f. detecting circuit 34 for obtaining speed information from the detected back e.m.f. Thus, the microcomputer control the motor speed by monitoring motor speed information so that the magnetic head is prevented from falling on the hard disk surface faster than a specified speed.

Further, the serial port 32 has a function to generate an enable EN signal to the timing generating circuit 19 of the spindle motor control system based on data received from the microcomputer, and generates control signals, such as a phase selection setting signal COMM. Note that when the phase switching control circuit 12 starts the motor by a phase selection setting signal COMMST supplied from the start current conduction phase determining circuit 21 as in the above-mentioned embodiment, it becomes unnecessary to send a phase selection setting signal COMM from the microcomputer. However, without mounting the discriminating circuit 18 for discriminating the start current conduction phases from a polarity detection result in the start current conduction phase determining circuit 21 and if it is arranged that the microcomputer receives information from the latch circuits 17a to 17c, which store polarity data, and determines and sets a pair of phases for start current conduction in the phase switching control circuit 12, the above-mentioned route passing through the serial port 32 can be used to initialize the phase switching control circuit 12.

Meanwhile, in the motor driver unit in this embodiment, there are provided a power terminal P6 for a power source voltage Vss of 5V for example, a power terminal P7 for a power supply voltage Vdd of 12V or 5V, and a set of power terminals P8 for ground potential (0V). To the power terminal P7, 12V is applied for use in a 3.5-inch hard disk device, or 5V is applied for use in a 2.5-inch hard disk device. P11 to P14 denote the terminals connected to the terminals of the field coils of a spindle motor.

Figure 11:
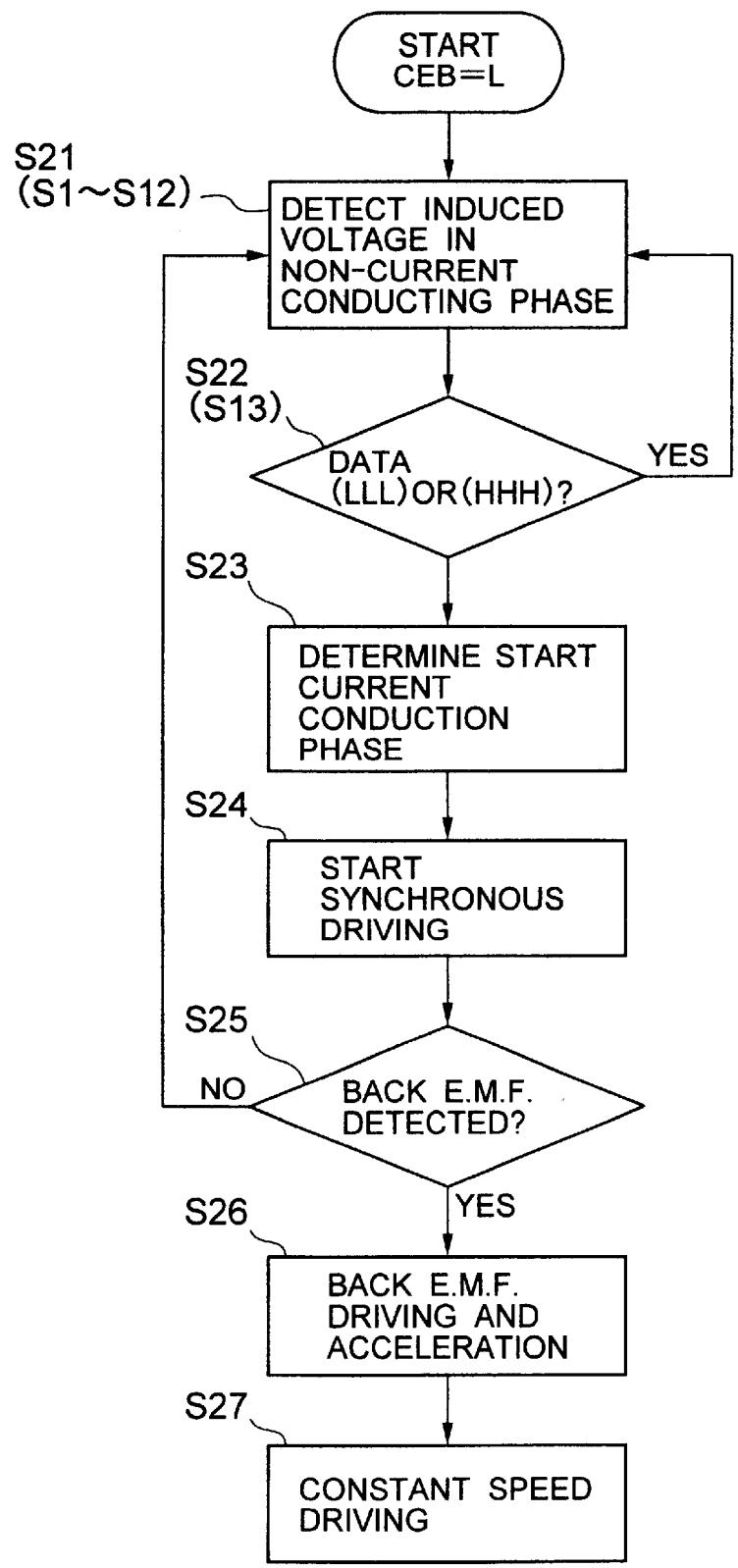
FIG. 11 is a flowchart showing a control procedure from starting the motor till a constant speed operation in a motor driver unit including the brushless motor drive control apparatus according to one embodiment of the present invention.

FIG. 11 shows a control procedure from starting of a motor till a constant speed drive in the motor driver unit, which includes the start current conduction phase determining circuit.

In this motor driver unit, when a start signal is given by the microcomputer, the start current conduction phase determining circuit 21 detects rotor position to begin with (step S21). This rotor position detection is performed by the steps S1 to S12 in the flowchart in FIG. 8, which has been described. When the rotor position has been detected, a decision is made in a step S22 whether rotor data are all "LL" (low level) or all "H" (high level), if the decision result is "Yes", which means that data are all "L" or all "H", rotor position determination (step S21) is performed again. It ought to be noted that the step S22 corresponds to the S13 in FIG. 8. If the decision result is "No" in the step S22, which means that position data are neither all "L" nor all "H", the phases for start current conduction are set in the phase switching control circuit 12 by a signal COMMST based on detection results from the start current conduction phase determining circuit 21 (step S23).

Subsequently, the phase switching control circuit 12 controls the phase current output circuit 11 to change over the coils that are excited sequentially to conduct a drive current to the coils of the motor, to start synchronous driving (step S24). When the rotor starts to rotate normally, back e.m.f develops in the non-conducting phases, and a decision is made in the next step S25 whether the back e.m.f. detecting circuit 23 detected back e.m.f. If the back e.m.f. was not detected, a decision is made that the motor has not started, and the process returns to the step 21 to perform rotor position detection again. On the other hand, if back e.m.f. was detected, in a step S26, back e.m.f. driving is performed which switches over the conducting phases according to timing of the zero-cross points detected by the back e.m.f. detecting circuit 23 and the rotation is accelerated by an increase of current passed through the coils, and the motor enters constant-speed driving (step S27).

Figure 12:
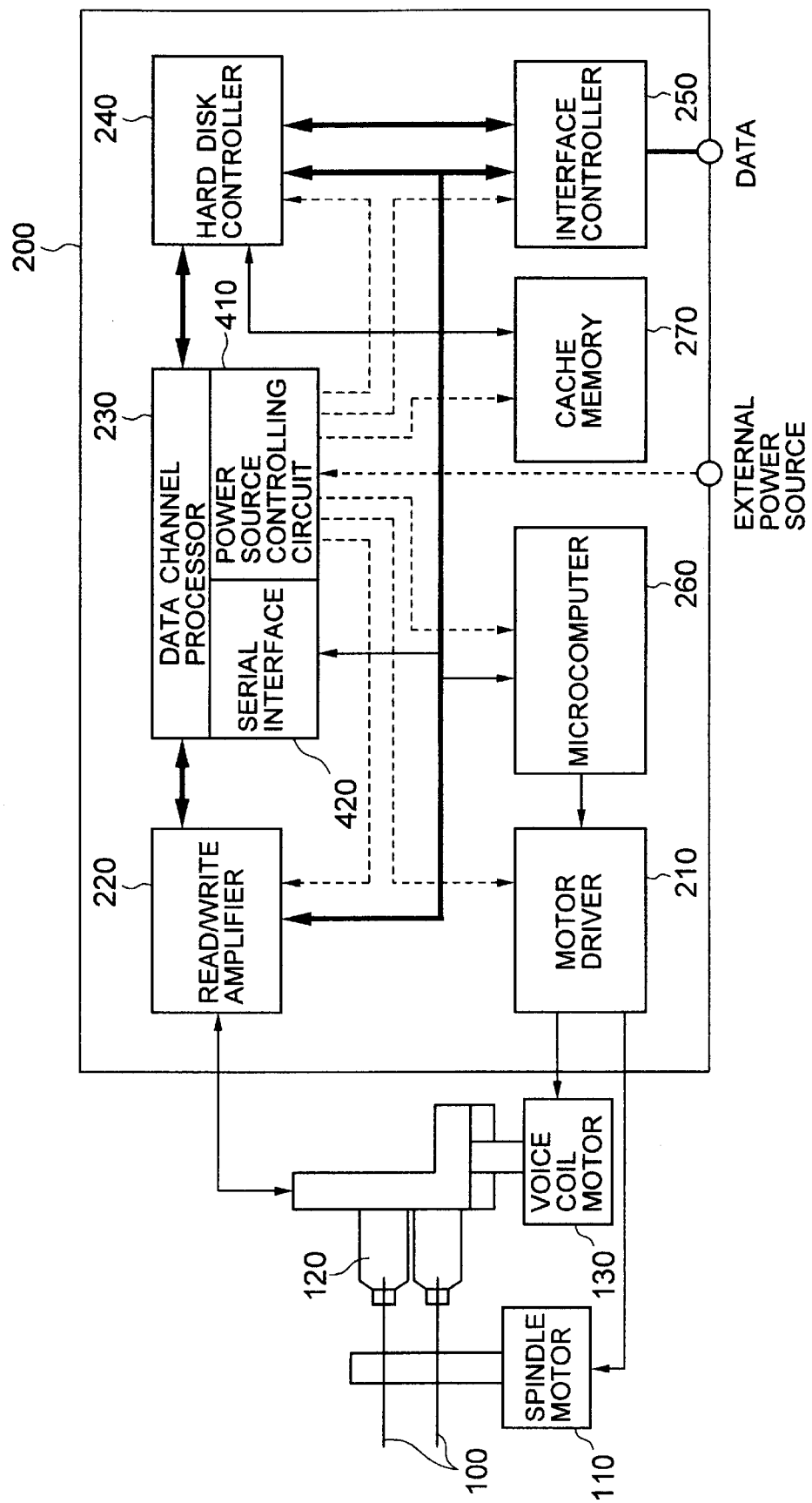
FIG. 12 is a block diagram showing a representative configuration of the hard disk device as an example of a system using the motor driver unit including the brushless motor drive control apparatus according to one embodiment of the present invention.

FIG. 12 is a block diagram of an example of a hard disk device as a system including a motor driver unit according to one embodiment of the present invention.

In FIG. 12, reference numeral 100 denotes a recording medium such as a magnetic disk, 110 denotes a spindle motor to drive the magnetic disk 100, 120 denotes a magnetic head including a write head and a read head, and 130 denotes a voice coil motor to move the arm assembly with the magnetic heads 120. Reference numeral 210 denotes a motor driver unit that can be realized by embodying the present invention, and the motor driver unit 210 drives both the spindle motor 110 and the voice coil motor 130.

Reference numeral 220 denotes a read/write amplifier for amplifying a current, produced according to magnetic changes detected by the magnetic head 120 to transmit a readout signal to a data channel processor 230, and for amplifying a write pulse signal from the data channel processor 230 to supply a drive current to the magnetic head 120. Reference numeral 240 denotes a hard disk controller for receiving readout data RDT sent from the data channel processor 230, performing an error correcting process thereon and performing an error correction coding process on write data from the host computer to supply the processed data to the data channel processor 230. The data channel processor 230 performs a modulation/demodulation process suitable for digital magnetic recording and carries out a signal process, such as waveform shaping or the like taking magnetic recording characteristics into account.

Reference numeral 250 denotes an interface controller that controls exchange of data between this system and external equipment, and the hard disk controller 240 mentioned above is connected to a host computer, such as the microcomputer of a personal computer, through the interface controller 250. Reference numeral 260 denotes a microcomputer that performs a comprehensive control of the whole system and calculates a sector position from address information supplied from the hard disk controller 240, and 270 denotes a buffer cache memory for temporarily storing read data read at high speed from the magnetic disk. The microcomputer 260 determines the operation mode from a signal sent by the hard disk controller 240, and controls the related parts of the system according to the operation mode.

The motor driver unit 210, as described above, comprises a spindle motor drive part and a voice coil motor drive part. By a signal from the microcomputer 260, the spindle motor drive part is servo-controlled to make the relative speed of the heads constant and the voice coil motor drive part is servo-controlled to make the center of the head coincident with the center of a truck.

The hard disk control system 200 is formed by the motor driver unit 210, the read/write amplifier 220, the data channel processor 230, the hard disk controller 240, the interface controller 250, the microcomputer 260, and the cache memory 270. The hard disk device is formed by the control system 200, the magnetic disks 100, the spindle motor 110, the magnetic heads 120, and the voice coil motor 130.

Description has been made of the embodiments made by the inventors. However, the present invention is not limited to those embodiments, but obviously many changes and modifications of the present invention may be made without departing from the spirit or scope of the invention. For example, in the above-mentioned embodiments, description has been made using a three-phase motor as an example, but the present invention is not limited to three-phase motors, but may be applied to the driving circuits of two-phase motors and four-phase or other polyphase motors. Further, in those embodiments, the motor driver unit described has been a composite type that includes not only the driving circuit of the spindle motor but also the driving circuit of the voice coil motor mounted on one semiconductor chip. However, needless to say, the present invention may be applied to a semiconductor integrated circuit having only the spindle motor driving circuit mounted on it.

Moreover, description has centered around the field as the backdrop of the invention in which the invention made by the inventors is applied to the motor driver unit of the hard disk storage device, but the present invention is not limited to this area and may be utilized in motor driver units for driving brushless motors, such as a motor to drive the polygon mirror of a laser beam printer or a motor for an axial flow fan.

According to the embodiments of the present invention, it is possible to realize a semiconductor integrated circuit for brushless motor drive control and a brushless motor drive control apparatus, which are capable of preventing a reverse rotation when starting the motor by detecting the rotor position relative to the stator with less errors to determine field coils at which current conduction is started.

What is claimed is:

1. A semiconductor integrated circuit for a drive control apparatus of a polyphase brushless motor having a plurality of field coils, comprising:

a phase current output circuit for-generating a current to pass through respective field coils of said motor;

output terminals for outputting a current to pass through field coils of respective phases of said motor, said current being generated by said phase current output circuit;

a phase switching control circuit capable of controlling said phase current output circuit to switch a current to pass from one pair of field coils to another pair of field coils of said motor for constant-speed rotation thereof and, when starting said motor, capable of controlling said phase current output circuit to conduct a pulse current, having such a duration as not to cause the rotor to react, to each of a plurality of field coil pairs of said motor alternately in first and second, mutually opposite, directions sequentially;

an induced voltage detecting circuit, connected to said phase current output circuit, for detecting first and second voltages induced in each of said field coils of a non-conducting phase by said pulse current in said two directions;

an integrating circuit for generating a rotor position signal by integrating said first induced voltage by said pulse current in said first direction and then integrating said second induced voltage by said pulse current in said second direction at each of said field coils of the non-conducting phase;

a polarity detecting circuit for generating a polarity signal representing a polarity of a rotor position signal generated by said integrating circuit at each of said field coils of the non-conducting phase;

a memory circuit for storing polarity data representing a plurality of polarity signal generated by said polarity detecting circuit; and a discriminating circuit for determining a field coil pair for current conduction to start said motor on the basis of multiple pieces of polarity data stored in said memory circuit and generating a phase selection setting signal to be supplied to said phase switching control circuit, each of said circuits and said output terminals being formed on a single semiconductor chip.

2. A semiconductor integrated circuit according to claim 1, wherein said integrating circuit includes a capacitor element connected as an externally-mounted element to an external terminal provided on said semiconductor chip.

3. A semiconductor integrated circuit according to claim 1, further comprising a timing circuit, mounted on said semiconductor chip, for generating control signals on the basis of a clock signal for operating said phase switching control circuit, said induced voltage detecting circuit, said integrating circuit, said memory circuit and said discriminating circuit respectively at predetermined timing.

4. A semiconductor integrated circuit according to claim 1, further comprising a back e.m.f detecting circuit, mounted on said semiconductor chip and connected to said phase current output circuit, for detecting zero cross points generated in the field coils of the non-conducting phase and generating a phase switching timing signal, wherein said phase switching control circuit switches a current from one field coil pair to another according to said phase switching timing signal from said back e.m.f. detecting circuit after the motor is started and said phase current output circuit supplies the motor with a current of a larger amplitude than that of said pulse current sent to determine a field coil pair for current conduction to start the motor.

* * * * *